W. R. Stace
Tailors' Measure
Nº 20,826.  Patented Jul. 6, 1858.
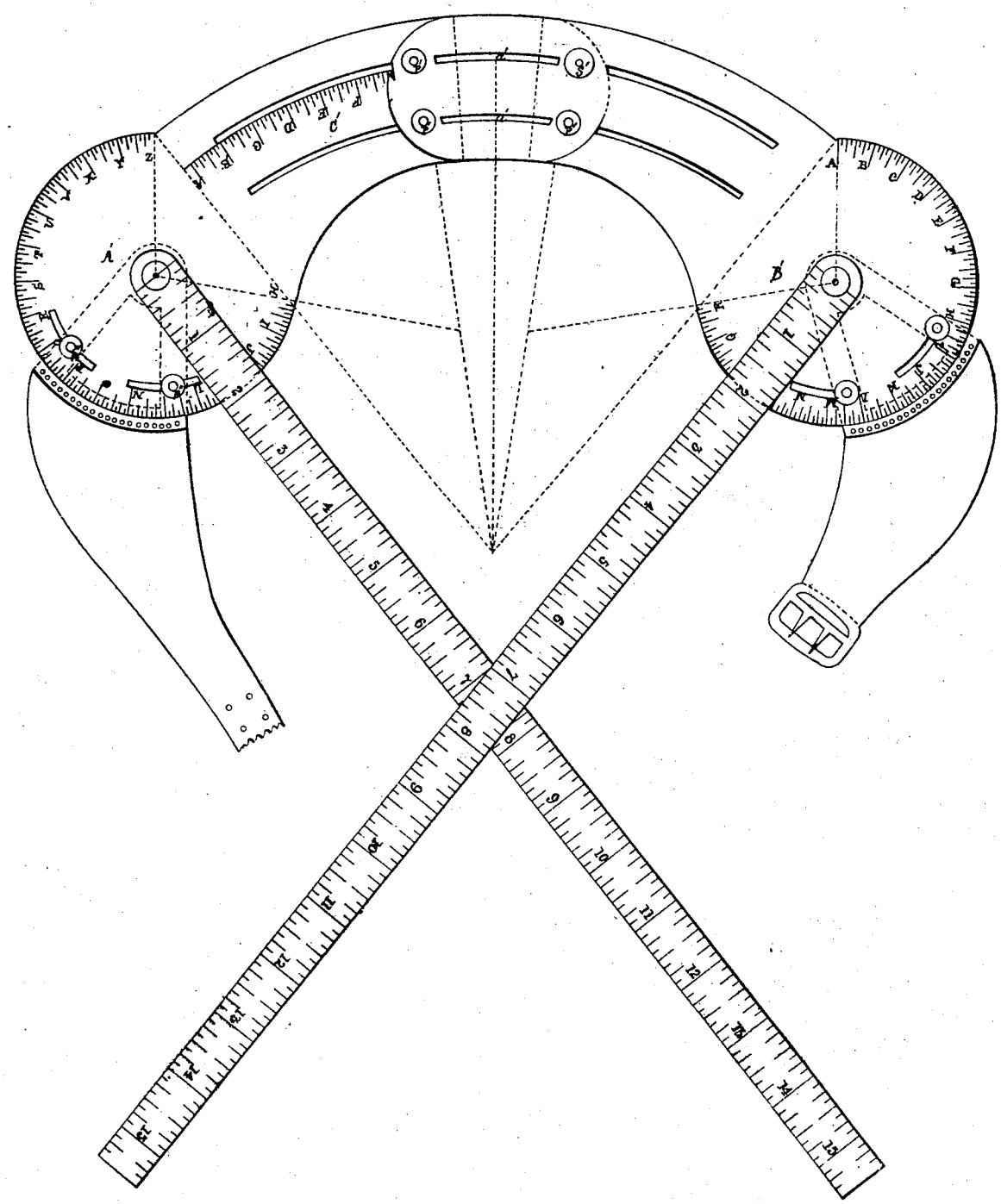

UNITED STATES PATENT OFFICE.

W. R. STACE, OF ROCHESTER, NEW YORK.

TAILOR'S MEASURE.

Specification of Letters Patent No. 20,826, dated July 6, 1858.

*To all whom it may concern:*

Be it known that I, W. R. STACE, of the city of Rochester, in the county of Monroe and State of New York, have invented a certain new and Improved Instrument for Taking Measures for Garments; and I do hereby declare the following to be a full and accurate description of the same, reference being had to the accompanying drawings, making part of this specification, and to the letters of reference marked thereon.

The nature of this invention consists in an improved means of locating the shoulder point, or in other words of placing the shoulder in its proper position with the back part of the coat. The general methods of doing this place it either too forward or too backward—too long or too short—and a bad fit must be the consequence. This may not always be occasioned by the shoulder point being wrong but from the back part not being cut with corresponding exactness.

My instrument enables the operator not only to take the measure with unerring accuracy but also to draft the garment with equal precision.

The instrument consists, as will be seen on reference to the drawing, of two graduated circles, arcs, or dial-plates A' B' to the centers of which are attached graduated arms or radii which give the distance from said centers to any part of the body, while the graduated arcs enable us to determine the direction of said measure. These dials or circles are connected by means of symmetrical curved arms which slide upon one another and so contract or expand yet are all the while kept to the proper curve by means of the pins ($p'$ $p'$ $p'$) and screw ($s'$) working in the curved slots ($a'$ $a'$) so as to follow accurately the curved line under the arm or lower part of scye. Under each dial and fastened by the same screw which holds the slats or radial arms, is a triangular plate which is still further kept in place by means of the slot and pin ($p''$). To these are attached suitable straps and buckles running over the opposite shoulder in order to keep the instrument close to the lower part of the scye and to bring the dials close to the body, this being necessary to the accurate use of the instrument.

Having made marks at the top of the back, in the center of back opposite back scye, and at the back scye and hollow of waist, I place the instrument under the arm, (the right side being preferred except in cases of deformity in which I use it on each side in succession) bringing the dials close to the point and back part of scye by means of the curved arms and slot. The thumb screw ($s$) being now tightened the instrument is secured in this position by placing the strap over the opposite shoulder and then buckling it. From the dial at the back I measure to the mark at back scye, and note the angle. From the same dial I measure to the top of the back and also note the angle; and to the center of back in a horizontal direction. From the front dial I measure to the center of chest, to the top of back, to the mark in the center of back, (being careful that the slat lies quite flat on the shoulder) and note the angle. This measure and angle place the shoulder in the exact relative position with the points previously located at the back, and from the dial to the mark at the back scye. This measure perfects the size of scye, (the last measure is to the hollow of waist). I then remove the instrument and ascertain its expansion by the graduation on the curved arm ($c'$). The other measures are taken in the usual way.

Having thus described my invention, what I claim therein as new, and desire to secure by Letters Patent, is—

The construction and use, substantially as described, of an instrument for measuring and drafting garments, said instrument consisting of the graduated arcs or dial-plates (A' and B') connected by the graduated arc ($c'$) said arc being expansible by means of slots, pins, and screw as described.

W. R. STACE.

Witnesses:
  P. B. HULETT,
  I. CUTTER.